Sept. 9, 1969 C. J. ABRONSON 3,466,654
DUAL CHANNEL RADIOMETER
Filed Oct. 2, 1967
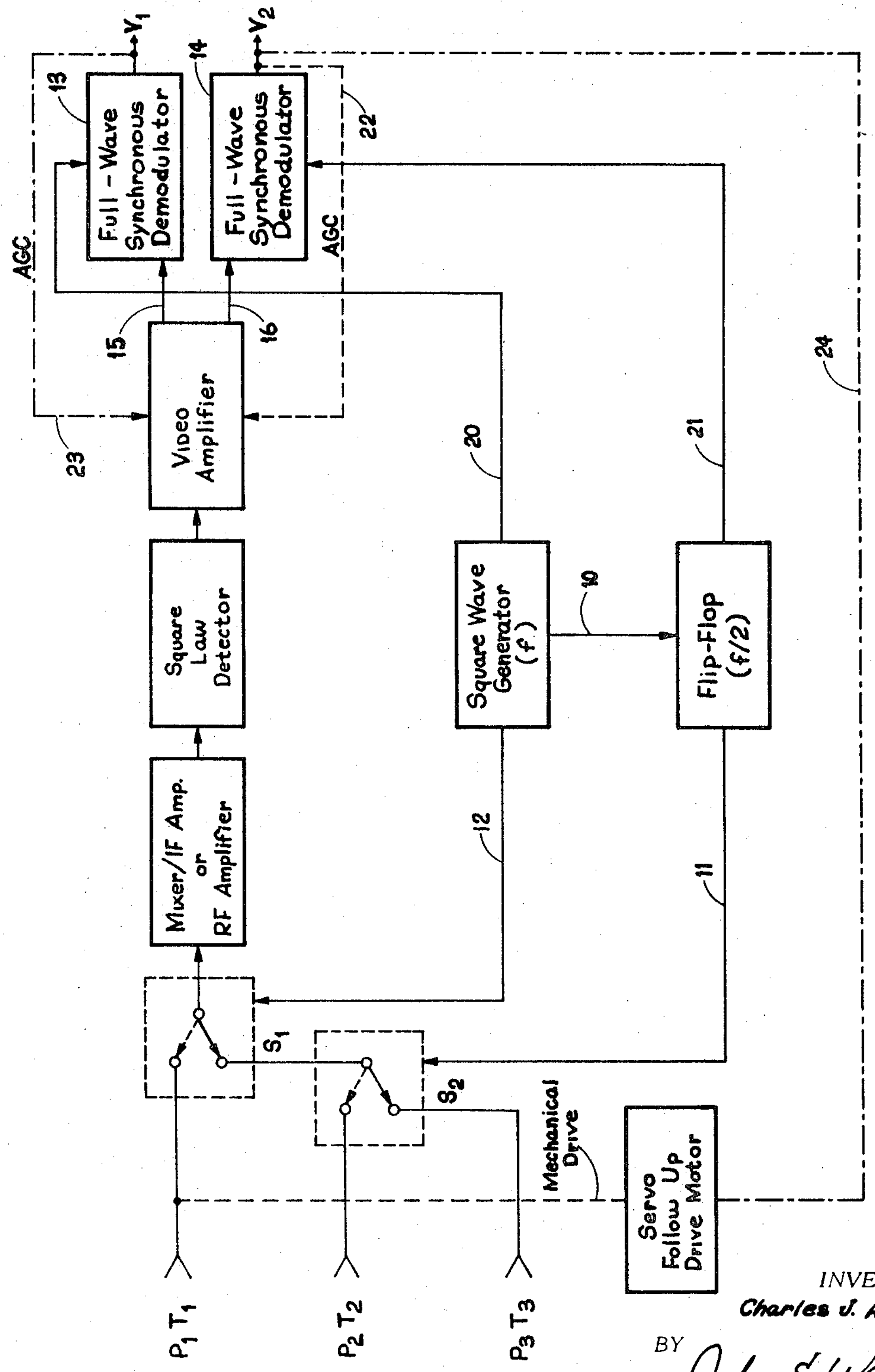
INVENTOR.
Charles J. Abronson
BY John E. Wagner United States Patent Office 3,466,654
Patented Sept. 9, 1969

3,466,654

DUAL CHANNEL RADIOMETER

Charles J. Abronson, Marina Del Rey, Calif., assignor to Aerojet-General Corporation, El Monte, Calif., a corporation of Ohio Filed Oct. 2, 1967, Ser. No. 673,253
Int. Cl. H04b *7/00*
U.S. Cl. 343—100 9 Claims

ABSTRACT OF THE DISCLOSURE

The disclosure relates to a multiple channel radiometer using a plurality of harmonically synchronized radio frequency switches and demodulators to switch between three antennas. Two data channels independent of receiver gain measure temperature differential between various polarizations. An error signal for target tracking is produced.

BACKGROUND OF THE INVENTION

Professor R. H. Dicke in his classic article, Review of Scientific Instruments, vol. 17, pp. 268–276, July 1946, described a self-calibrating radiometer employing a single waveguide port or antenna connected through a radio frequency switch to an RF stage, an IF amplifier, a second detector and an integrating display. The RF switch is driven by a switch signal generator which alternately connects the RF stage between the antenna and a known temperature reference load at a constant rate. The D.C. component of the modulated signal is extracted from a balanced mixer. The Dicke radiometer is considered the first stable radio astronomy receiver, since it minimized fluctuations in receiver response due to gain instabilities.

Based upon Professor Dicke's work, other systems have been designed using multiple local reference loads to allow nearly continuous calibration by rapid switching from the antenna to one reference load and then to the second reference. This latter modification is described by S. Weinreb in his paper "Advanced High Sensitivity Microwave Radiometers," appearing in the Summary of Papers, part 1, pp. 95–6 of the International Conference on Microwaves, Circuit Theory and Information Theory, Tokyo, Japan, 1964.

SUMMARY OF THIS INVENTION

I have discovered that it is possible by improvement upon this prior art to produce a continuously calibrated multiple channel microwave radiometer using a single information channel and multiple synchronized RF switches and demodulators.

One feature of this invention involves the synchronized switching between three sources of radiometric information at two rates followed by synchronous demodulation to produce two channels of data independent of receiver gain.

Another feature of this invention involves the simultaneous measurement of two different channels of radiometric data and the development of the temperature difference between the two channels.

Still another feature of this invention resides in the combination of three input ports, two directed toward an object to be tracked, a second directed toward the background and the third directed in the region near the target but offset to sense the background, and the three input signals are synchronously demodulated to produce tracking error correction signals.

These features may be more clearly understood from the following detailed description and by reference to the drawing which is a block diagram of the basic system of this invention.

Now referring to the drawing, in the system block diagram $P_1$, $P_2$ and $P_3$ are input ports at temperatures $T_1$, $T_2$ and $T_3$ respectively. $S_1$ and $S_2$ are radio frequency switches operating at switch rates of $f$ and $f/2$ produced by square wave generator ($f$) and its synchronized (via lead 10) flip flop ($f/2$) respectively. $S_2$ is synchronized with $S_1$ by the frequency dividing flip-flop ($f/2$) over lead 11. $S_2$ switches between ports $P_2$ and $P_3$; $S_1$ between port 1 and $S_2$. The output of $S_1$ is connected to the input of a microwave receiver comprising a mixer/IF amplifier or RF amplifier followed by a square law detector and video amplifier. The RF signal modulated by the RF switches $S_1$ and $S_2$ is detected by the square law detector and the detected voltage amplified as in the normal Dicke radiometer. The output of the video amplifier is connected to two full-wave synchronous demodulators 13 and 14 via respective leads 15 and 16 switched at rates $f$ and $f/w$ (in synchronism with $S_1$ and $S_2$) with demodulator 13 under the control of the square wave generator ($f$) over lead 20 and demodulator 14 similarly controlled by flip flop ($f/2$) over lead 21 to provide the two radiometer output signal voltages.

It can be shown that the output signals are:

$$V_1=\frac{c}{2}\left(T_1\frac{T_2+T_3}{2}\right) \quad (1)$$

$$V_2=\frac{c}{2}\left(\frac{T_2-T_3}{2}\right) \quad (2)$$

where:

C=radiometer constant=$(1/L)kB_{RF}G_{RF}\gamma G_V$ (volts/°K.),

L=transmission loss from antenna input to receiver input (assumed equal for all three ports), k=Boltzman's constant $1.38\times10^{-23}$ jouls/° K., $B_{RF}$=radio frequency noise band width, $G_{RF}$=RF power gain, $\gamma$=square law detector responsivity (volts/watt), $G_V$=voltage gain from square law detector output to synchronous demodulator input.

Similar results are obtained if the switching frequencies at $S_1$ and $S_2$ are reversed.

If output voltages $V_1$ and $V_2$ are compared by finding their sum and difference, it can be shown from Equations 1 and 2 that:

$$V_1-V_2=\frac{c}{2}(T_1-T_2) \quad (3)$$

and $$V_1+V_2=\frac{c}{2}(T_1-T_3) \quad (4)$$

This system therefore provides a method of continuously measuring the difference in radiometric temperature between any two of three radiometer input ports.

Thus far three applications have been found for the system.

(I) Self calibrating radiometer

A major problem with radiometer systems is receiver gain stability. Small changes in system gain can produce appreciable errors in measured target temperature.

The calibration constant C (Equations 3 and 4) contains all the necessary information regarding the system gain, i.e., a change in gain in any portion of the receiver is reflected by a change in C.

In FIGURE 1 assume ports 2 and 3 are maintained at constant reference temperatures $T_2$ and $T_3$ by direction at known temperature reference loads, and port 1 is the receiving antenna. From Equation 2 it can be seen that $V_2$ is independent of $T_1$ and depends only on the calibration constant C. This signal can be recorded separately from radiometric target data to indicate system gain fluctuations, or can be used as a feedback voltage for automatic gain control as shown by the dashed line 22.

$V_1$ provides target temperature data. Channel 1 output is equivalent to that which would be obtained by replacing $S_2$ with a reference load at $$\left(\frac{T_2+T_3}{2}\right)$$

and operating in the normal Dicke mode.

II Continuous measurement of difference in polarization components of target radiation Valuable information can often be obtained about a target by measuring the difference in apparent temperature in different polarization, for example, between vertical and horizontal or clockwise and counterclockwise circular polarization and, at the same time, the average of the polarization components. Additionally the ratio of the difference to the average yields further information.

For this mode of operation ports $P_2$ and $P_3$ are antennas of different polarization, e.g., $P_2$ vertically polarized and $P_3$ horizontally polarized respectively and $P_1$ is a reference load at temperature $T_1$.

$V_1$ now provides an output that is proportional to the difference in temperature between the reference load and the *average* of the vertically and horizontally polarized antennas. $V_2$ gives the difference in temperature between the horizontally and vertically polarized antennas.

(III) Tracking radiometer

For tracking applications, $P_1$ is a reference antenna that is directed to sense the background temperature in the immediate vicinity of a target to be tracked. $P_2$ and $P_3$ are the tracking antennas.

The signal $V_1$ indicates the target magnitude while the signal $V_2$ is proportional to the angular error. $V_1$ is used for automatic gain control as in application (I) above, except that the AGC feedback is over the dash-dot line 23 such that the difference signal $V_2$ is independent of target amplitude. $V_2$ is then fed via dash-dot lead 24 to a conventional servo follow-up drive motor which continuously corrects the antenna array pointing error.

Therefore, it can be seen that employing the system of my invention, a multichannel, self-calibrating radiometer can be produced. It basically uses three ports, two switches in cascade, a receiver and two synchronous demodulators in parallel. It not only achieves virtually continuous self-calibration but by comparison of the output voltages, $V_1$ and $V_2$ can produce the difference between any two of the three targets viewed by the ports. Moreover, the system can be used for both comparison of different polarization components and for tracking.

For purposes of explanation, the number of ports illustrated and described is 2 and the switching rates are designated as $f$ and $2f$. It should be recognized that the concept of this invention can be extended in implementation by the addition of additional ports, switches and synchronous demodulators to produce truly multi-channel operation. In such case all switches operate at harmonies $(nf)$ of the rate $(f)$ and the sum and difference between the first and other antennas or ports is determined in sequence. The number of switches and synchronous demodulators equals the number of ports P less one or $P-1$.

The foregoing is a description of one or more embodiments of my invention. It is recognized that one skilled in the art can devise variations from the specific forms in which my invention is illustrated. In accordance with the Patent Laws of the United States, the rights granted thereunder are not limited to the specific embodiments illustrated, but rather by the scope of the following claims and their equivalents.

What I claim is:

1. A radiometer system comprising:
three ports for receiving incident energy;
a receiver;
two switches for selectively connecting the said ports to the receiver;
the first switch selectively connecting one port or the second switch to the input of the receiver;
the second switch connected to selectively connect the second or third port to the first switch;
means for generating a frequency $(f)$;
means synchronized with the $f$ frequency generating means for producing a harmonic of the frequency $(f)$;
first and second synchronous demodulators connected in parallel to the output of the receiver;
the first switch and first synchronous demodulator driven in synchronism by the $f$ frequency generator;
the second switch and second synchronous demodulator driven in synchronism with the harmonic frequency generating means; and
whereby the first and second synchronous demodulators produce output voltages proportional to the temperature of the incident energy at the three ports.

2. The combination in accordance with claim 1, wherein the harmonic frequency generating means produces a frequency $2(f)$ synchronized with the frequency $(f)$.

3. The combination in accordance with claim 1, wherein the second and third ports are maintained at constant reference temperatures and wherein the output of the second demodulator is fed back to the receiver as an automatic gain control signal and the output of the first synchronous demodulator constitutes a voltage proportional to the temperature of the energy incident upon the first port and independent of receiver gain variations.

4. A multichannel reeciving system comprising:
a plurality of antennas;
a single receiver for the plurality of antennas;
a first switch for selectively switching the receiver between one antenna and an input line;
a second switch for selectively connecting the remaining antennas to the input line to the first switch;
means for driving said first switch at a substantially constant rate $(f)$;
means for driving said second switch in synchronism with the first switch at a rate $(nf)$ harmonically related to the rate of operation of the first switch;
first and second synchronous demodulators connected in parallel to the output of the receiver;
means driving the first synchronous demodulator at rate $(f)$ in synchronism with the first switch; and
means driving the second synchronous demodulator at rate $(nf)$ in synchronism with the second switch.

5. The combination in accordance with claim 4, wherein the plurality of antennas is three in number.

6. The combination in accordance with claim 4, wherein $n$ is equal to 2.

7. The combination in accordance with claim 4, wherein the plurality of antennas is P in number and the switches and demodulators is $P-1$ in number.

8. A system for detecting the difference in level of incident energy at different polarizations comprising:
a first port insensitive to polarization differences and directed toward a target of known energy emission level;
a second port responsive to energy in one polarization;
a third port responsive to energy in the complementary polarization;
a receiver for detecting energy received by the ports;
first switch means for alternately connecting the first port and an input line to the input of the receiver;
second switch means for alternately connecting the second and third ports to the said input line;
first and second demodulators connected in parallel to the output of the receiver;

means for synchronously operating the first switch and first synchronous demodulator at a rate ($f$);

means for operating the second switch and second synchronous demodulator at a rate ($nf$) in synchronism with each other and the first switch and first synchronous demodulator;

whereby the first synchronous demodulator produces an output proportional to the difference in level of incident energy of the target and the average level at the second and third ports and the second synchronous demodulator produces an output proportional to the difference in level of incident energy at the second and third ports.

9. A tracking radiometer comprising:

first, second and third ports for receiving incident energy;

the second and third ports mounted for tracking;

a source of incident energy;

the first port mounted for monitoring the background level of incident energy in the vicinity of any energy source tracked by the second and third port;

a receiver;

two switches for selectively connecting the said ports to the receiver;

the first switch selectively connecting one port or the second switch to the input of the receiver;

the second switch connected to selectively connect the second or third port to the first switch;

means for generating a frequency ($f$);

means synchronized with the $f$ frequency generating means for producing a harmonic of the frequency ($f$);

first and second synchronous demodulators connected in parallel to the output of the receiver;

the first switch and first synchronous demodulators driven in synchronism by the $f$ frequency generator;

the second switch and second synchronous demodulator driven in synchronism with the harmonic frequency generating means;

means for applying the output of the first synchronous demodulator to automatically control the gain of the receiver; and, means for applying the output of the second synchronous demodulator to control the position of the ports, whereby the radiometer tracks the source of incident energy.

References Cited

UNITED STATES PATENTS

| | | | |
|---|---|---|---|
| 2,947,986 | 8/1960 | Marner et al. | 343—117 |
| 3,230,532 | 1/1966 | Whitney | 343—100 |

RODNEY D. BENNETT, JR., Primary Examiner

U.S. Cl. X.R.

73—355; 325—363; 343—120, 117